United States Patent
Li et al.

(10) Patent No.: US 9,910,252 B2
(45) Date of Patent: Mar. 6, 2018

(54) OPTICAL LENS

(71) Applicant: HAN'S LASER TECHNOLOGY INDUSTRY GROUP CO., LTD., Shenzhen (CN)

(72) Inventors: Jiaying Li, Shenzhen (CN); Chaoming Zhou, Shenzhen (CN); Bo Sun, Shenzhen (CN); Hai Huang, Shenzhen (CN); Yunfeng Gao, Shenzhen (CN)

(73) Assignee: HAN'S LASER TECHNOLOGY INDUSTRY GROUP CO., LTD., Shenzhen (CN)

( * ) Notice: Subject to any disclaimer, the term of this patent is extended or adjusted under 35 U.S.C. 154(b) by 0 days.

(21) Appl. No.: 15/328,872

(22) PCT Filed: Sep. 2, 2014

(86) PCT No.: PCT/CN2014/085712
§ 371 (c)(1),
(2) Date: Jan. 24, 2017

(87) PCT Pub. No.: WO2016/033730
PCT Pub. Date: Mar. 10, 2016

(65) Prior Publication Data
US 2017/0219805 A1    Aug. 3, 2017

(51) Int. Cl.
*G02B 9/00* (2006.01)
*G02B 13/14* (2006.01)
*G02B 9/64* (2006.01)

(52) U.S. Cl.
CPC ............... *G02B 13/14* (2013.01); *G02B 9/64* (2013.01)

(58) Field of Classification Search
CPC .................................................. G02B 9/64
(Continued)

(56) References Cited

U.S. PATENT DOCUMENTS

2004/0257677 A1   12/2004   Matsusaka
2013/0128369 A1*   5/2013   Kim ...................... G02B 13/04
                                                        359/714

FOREIGN PATENT DOCUMENTS

CN         2725922 Y      12/2004
CN         2725917 Y       9/2005
(Continued)

OTHER PUBLICATIONS

International Search Report dated May 29, 2015 for application No. PCT/CN2014/085712.

*Primary Examiner* — James Jones
(74) *Attorney, Agent, or Firm* — Platinum Intellectual Property LLP

(57) ABSTRACT

An optical lens includes a first lens (L1), a second lens (L2), a third lens (L3), and a fourth lens (L4), which are successively coaxially arranged along the transmission direction of incident light, wherein the first lens (L1) and the fourth lens (L4) are negative meniscus lenses, the second lens (L2) is a positive meniscus lens, and the third lens (L3) is a positive plano-convex lens. The optical lens can be applied to an optical system of a laser processing device, when a utilized processing wavelength is different from a monitoring wavelength, the imaging chromatic aberration in a monitoring system may be eliminated, particularly when a wavelength of the far infrared region is utilized as a wavelength for laser processing. When using the red light wavelength as the monitoring wavelength, the monitoring system can achieve a better imaging effect, thus ensuring the quality of laser processing.

9 Claims, 2 Drawing Sheets

(58) Field of Classification Search
USPC .......................................................... 359/754
See application file for complete search history.

(56) References Cited

FOREIGN PATENT DOCUMENTS

| CN | 101236291 A | 8/2008 |
| CN | 101236303 A | 8/2008 |
| CN | 103984078 A | 8/2014 |

* cited by examiner

OPTICAL LENS

RELATED APPLICATIONS

This application is a United States National Stage Application filed under 35 U.S.C 371 of PCT Patent Application Serial No. PCT/CN2014/085712, filed Sep. 2, 2014, the disclosure of all of which are hereby incorporated by reference in their entirety.

FIELD OF THE INVENTION

The present disclosure relates to the field of optics, and more particularly relates to an optical lens applied in a laser processing.

BACKGROUND OF THE INVENTION

With the increasing development of the laser processing technology, a full monitoring of laser processing process (laser marking or laser cutting) is desired to ensure the processing quality. The current common monitoring method is to use a CCD monitoring system to monitor the entire processing process. Compared with the conventional processing system in which focusing is performed with the naked eye at the beginning of processing, the CCD monitoring system can monitor the entire process of processing. By monitoring the entire process, the parameters can be adjusted immediately in case of quality problems, thus ensuring the processing quality.

The current CCD monitoring system has a poor "vision" at a wavelength in the far infrared light, and it has a higher sensitivity of the band in the red light region, thus the CCD monitoring system usually employ red light to work. However, when the system utilizes the wavelength of the far infrared laser to process, there is chromatic aberration in the imaging of the CCD monitoring system, which cannot faithfully reflect the processing in real-time.

SUMMARY

Therefore, it is necessary to provide an optical lens which can be adapted to the operating wavelength of the far-infrared region, and when using a monitoring wavelength of infrared region, the imaging chromatic aberration in a monitoring system can be eliminated.

An optical lens includes a first lens, a second lens, a third lens, and a fourth lens, which are successively coaxially arranged along a transmission direction of incident light, wherein the first lens and the fourth lens are negative meniscus lenses, the second lens is a positive meniscus lens, and the third lens is a positive plano-convex lens; the first lens has a first surface and a second surface, the second lens has a third surface and a fourth surface, the third lens has a fifth surface and a sixth surface, the fourth lens has a seventh surface and an eighth surface, two surfaces of each lens are a light incident surface and a light outgoing surface of the lens, respectively, the first to the eighth surfaces are successively arranged along the transmission direction of the incident light; the first surface, the second surface, the third surface, the fourth surface, the sixth surface, the seventh surface, and the eighth surface are convex towards the transmission direction of incident light.

According to one embodiment, a radius of curvature of the first surface is −27±5% mm, a radius of curvature of the second surface is −110±5% mm, a central thickness of the first lens is 3±5% mm.

According to one embodiment, a radius of curvature of the third surface is −90±5% mm, a radius of curvature of the fourth surface is −30±5% mm, a central thickness of the second lens is 10±5% mm.

According to one embodiment, a radius of curvature of the fifth surface is ∞, a radius of curvature of the sixth surface is −63±5% mm, a central thickness of the third lens is 14±5% mm.

According to one embodiment, a radius of curvature of the seventh surface is −55±5% mm, a radius of curvature of the eighth surface is −90±5% mm, a central thickness of the fourth lens is 5±5% mm.

According to one embodiment, an interval between the second surface of the first lens and the third surface of the second lens along an optical axis is 2±5% mm, an interval between the fourth surface of the second lens and the fifth surface of the third lens along the optical axis is 0.5±5% mm, an interval between the sixth surface of the third lens and the seventh surface of the fourth lens along the optical axis is 20±5% mm.

According to one embodiment, the optical lens further includes a fifth lens, wherein the first lens, the second lens, the third lens, the fourth lens, and the fifth lens are successively coaxially arranged along the transmission direction of incident light, and the fifth lens is a planar lens.

According to one embodiment, a central thickness of the fifth lens is 3±5% mm.

According to one embodiment, the fifth lens has a ninth surface as a light incident surface and a tenth surface as a light outgoing surface, an interval between the ninth surface of the fifth lens and the eighth surface of the fourth lens along the optical axis is 2±5% mm.

The foregoing optical lens can be applied to an optical system of a laser processing device, when a wavelength of the far infrared region is utilized as a wavelength for laser processing. When using the red light wavelength as the monitoring wavelength, the monitoring system can achieve a better imaging effect, thus ensuring the quality of laser processing.

BRIEF DESCRIPTION OF THE DRAWINGS

The above objects, features and advantages of the present invention will become more apparent by describing in detail embodiments thereof with reference to the accompanying drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION OF THE EMBODIMENTS

Figure 1:
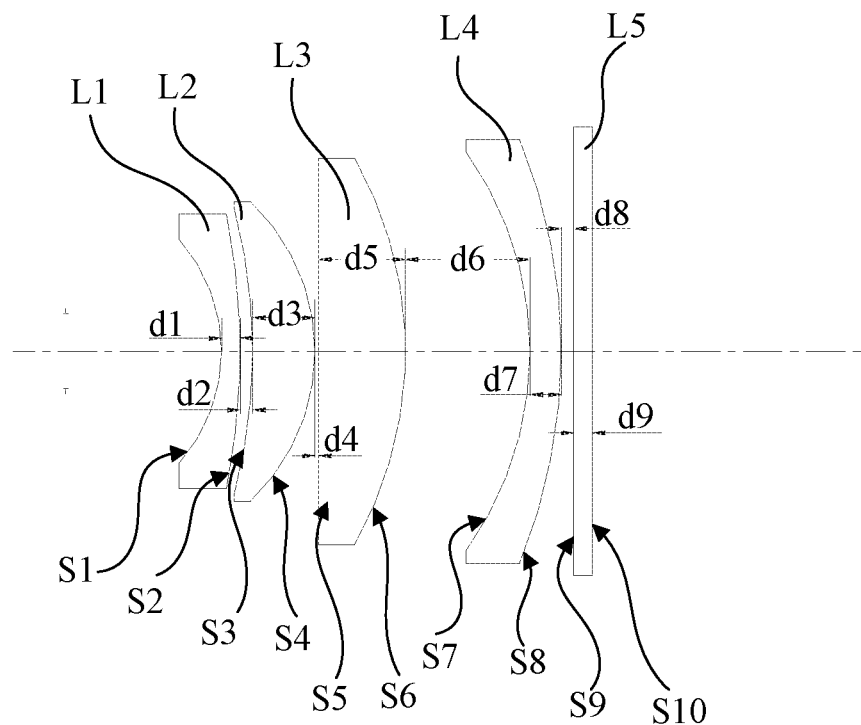
FIG. 1 is a schematic diagram of an optical lens according to an embodiment of the present invention.

In order to make the above and other objects, features and advantages of the present invention become more apparent, the specific embodiments will be described in detail in combination with the accompanying drawings.

It should be noted that the propagation direction of the light in the specification is from the left side to the right side of the drawing. The positive or negative curvature radius of the lens is determined by a relative positional relationship between an intersection point of the curved surface with the principal optical axis and the spherical center of the curved surface. If the spherical center of the curved surface is in the left of the intersection point, the radius of curvature has a negative value; if, on the other hand, the spherical center of the curved surface is in the right of the intersection point, the radius of curvature has a positive value. In addition, one side on the left of the optical lens is referred as the object side, and the other side on the right of the optical lens is referred as the image side. A positive lens means a lens which a central thickness of the lens is more than the thickness of the edge, and a negative lens means a lens which a central thickness of the lens is less than the thickness of the edge.

FIG. 1 is a schematic diagram of an optical lens according to an embodiment of the present invention, for illustrative purposes, only portions related to implementation of the disclosure are shown. The optical lens includes a first lens L1, a second lens L2, a third lens L3, and a fourth lens L4, which are successively coaxially arranged along a transmission direction of incident light.

The first lens L1 has a first surface S1 and a second surface S2, the second lens L2 has a third surface S3 and a fourth surface S4, the third lens L3 has a fifth surface S5 and a sixth surface S6, the fourth lens L4 has a seventh surface S7 and an eighth surface S8. Two surfaces of each lens are a light incident surface and a light outgoing surface, respectively. The first surface S1 to the eighth surface S8 are successively arranged along the transmission direction of the incident light.

The first lens L1 is a negative meniscus lens. The first surface S1 of the first lens L1 is convex towards an image side, a radius of curvature thereof is −27 mm. The second surface S2 is convex towards the image side, a radius of curvature thereof is −110 mm. The first lens L1 has a central thickness d1 (i.e. a thickness of the first lens L1 along an optical axis) of 3 mm. It should be understood that the foregoing parameters are expected values, and there exists a certain tolerance. The foregoing parameters has a tolerance range of 5%, i.e. those parameters can vary within a range of ±5%. In an embodiment, the material of the first lens L1 is Nd 1.62: Vd 34 (refractive index: chromatic dispersion coefficient).

The second lens L2 is a positive meniscus lens. The third surface S3 of the second lens L2 is convex towards the image side, a radius of curvature thereof is −90 mm. The fourth surface S4 is convex towards the image side, a radius of curvature thereof is −30 mm. The second lens L2 has a central thickness d3 of 10 mm. It should be understood that the foregoing parameters of the second lens L2 are expected values, and there exists a certain tolerance. The foregoing parameters has a tolerance range of 5%, i.e. those parameters can vary within a range of ±5%. In an embodiment, the material of the second lens L2 is Nd 1.62: Vd 60.

The third lens L3 is a positive plano-convex lens. The fifth surface S5 of the third lens L3 is a flat plane, which has a radius of curvature of infinite (cc). The sixth surface S6 is convex towards the image side, a radius of curvature thereof is −63 mm. The third lens L3 has a central thickness d5 of 14 mm. It should be understood that the foregoing parameters of the third lens L3 are expected values, and there exists a certain tolerance. The foregoing parameters has a tolerance range of 5%, i.e. those parameters can vary within a range of ±5%. In an embodiment, the material of the third lens L3 is Nd 1.62: Vd 60.

The fourth lens L4 is a negative meniscus lens. The seventh surface S7 of the fourth lens L4 is convex towards the image side, a radius of curvature thereof is −55 mm. The eighth surface S8 is convex towards the image side, a radius of curvature thereof is −90 mm. The fourth lens L4 has a central thickness d7 of 5 mm. It should be understood that the foregoing parameters of the fourth lens L4 are expected values, and there exists a certain tolerance. The foregoing parameters has a tolerance range of 5%, i.e. those parameters can vary within a range of ±5%. In an embodiment, the material of the fourth lens L4 is Nd 1.5: Vd 62.

In addition, intervals between each lens are configured as follows. Specifically, a expected value of an interval d2 between the outgoing surface (the second surface S2) of the first lens L1 and the incident surface (the third surface S3) of the second lens L2 along the optical axis is 2 mm, with a tolerance of 5%, i.e. the interval d2 can vary within a range of ±5%.

A expected value of an interval d4 between the outgoing surface (the fourth surface S4) of the second lens L2 and the incident surface (the fifth surface S5) of the third lens L3 along the optical axis is 0.5 mm, with a tolerance of 5%, i.e. the interval d4 can vary within a range of ±5%.

A expected value of an interval d6 between the outgoing surface (the sixth surface S6) of the third lens L3 and the incident surface (the seventh surface S7) of the fourth lens L4 along the optical axis is 20 mm, with a tolerance of 5%, i.e. the interval d6 can vary within a range of ±5%.

In an embodiment, the optical lens further includes a fifth lens L5. The first lens L1, the second lens L2, the third lens L3, the fourth lens L4, and the fifth lens L5 are successively coaxially arranged along the transmission direction of the incident light.

The fifth lens L5 has a ninth surface S9 as a light incident surface and a tenth surface S10 as a light outgoing surface. The fifth lens L5 is a planar lens which serves as a protective device, such that radii of curvature of the ninth surface S9 and the tenth surface S10 are infinite. The fifth lens L5 has a central thickness d9 of 3 mm. In addition, an interval d8 between the eighth surface S8 (the outgoing surface) of the fourth lens L4 and the ninth surface S9 (the incident surface) of the fifth lens L5 along the optical axis is 2 mm. Likewise, the foregoing parameters are expected values, there exists a certain tolerance. The foregoing parameters has a tolerance range of 5%, i.e. those parameters can vary within a range of ±5%. In an embodiment, the material of the fifth lens L5 is Nd 1.5: Vd 64.

The solution of the foregoing embodiments will be more clearly described in the following brief description:

The first lens L1
the radius of curvature of the first surface S1: −27 mm
the radius of curvature of the second surface S2: −110 mm
the central thickness: 3 mm
material: 1.62/34
The second lens L2
the radius of curvature of the third surface S3: −90 mm
the radius of curvature of the fourth surface S4: −30 mm
the central thickness: 10 mm
material: 1.62/60
the surface interval from the first lens L1: 2 mm
The third lens L3
the radius of curvature of the fifth surface S5: ∞
the radius of curvature of the sixth surface S6: −63 mm
the central thickness: 14 mm material: 1.62/60
the surface interval from the second lens L2: 0.5 mm
The fourth lens L4
the radius of curvature of the seventh surface S7: −55 mm
the radius of curvature of the eighth surface S8: −90 mm
the central thickness: 5 mm
material: 1.5/62
the surface interval from the third lens L3: 20 mm
The fifth lens L5
the radius of curvature of the ninth surface S9: ∞
the radius of curvature of the tenth surface S10: ∞
the central thickness: 3 mm
material: 1.5/64
the surface interval from the fourth lens L4: 2 mm An optical system equipped with the foregoing optical lens can utilize red light or infrared light having a wavelength range of 1064 to 660 nm as a light source for laser processing. In a laser processing apparatus equipped with a CCD monitoring system using red light as a monitoring light source, the color aberration in CCD imaging can be avoided due to this optical lens, thus obtaining a better imaging effect and a better real-time monitoring of the processing.

Next, by choosing far infrared laser of λ=1064 nm and the visible illumination light of λ=660 nm, the optical effect of the laser processing device having the optical lens is explained with reference to FIG. 2 to FIG. 4.

The specific parameters of the optical lens are as follows: f=160 mm; Φ=12 mm; marking range: λ=100*100 mm$^2$, where f is a focal length of the optical lens, Φ is an entrance pupil diameter.

Figure 2:
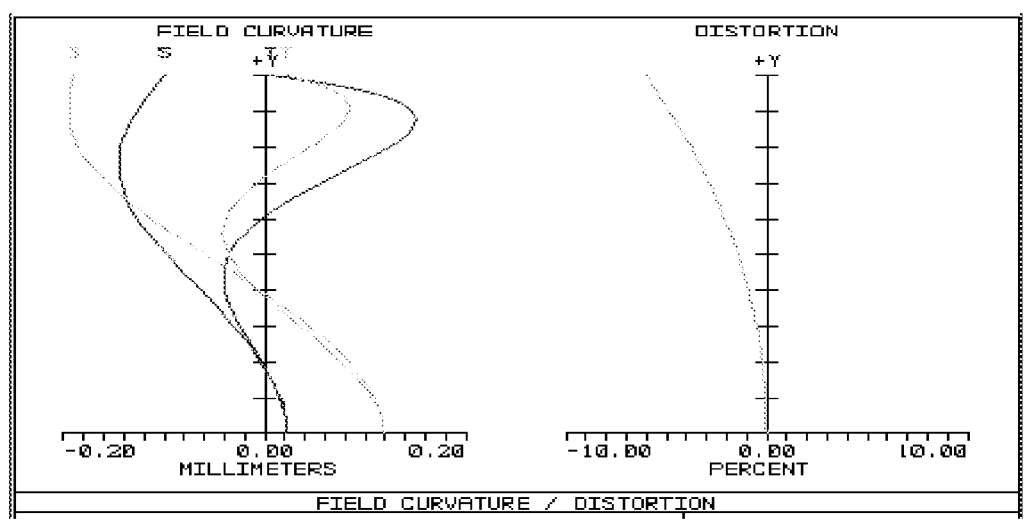
FIG. 2 is a diagram showing a fine beam aberration of the optical lens of FIG. 1.

FIG. 2 is a fine beam aberration of the optical lens. As can be seen from FIG. 2, a corrected chromatic aberration of the lens has reached an ideal correction of a conventional optical lens, image aberration ΔC≈0.01 is within a focal depth.

Figure 3:
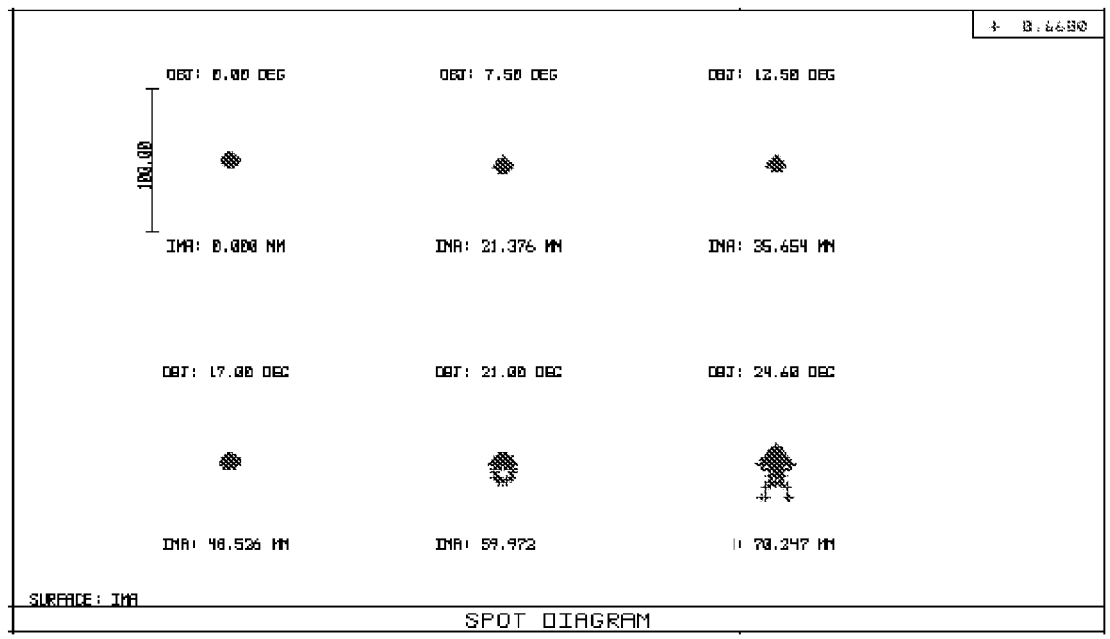
FIG. 3 is a diagram showing diffuse spots of the optical lens of FIG. 1.

FIG. 3 is a geometric image aberration of the lens. The correction reaches an ideal level.

Figure 4:
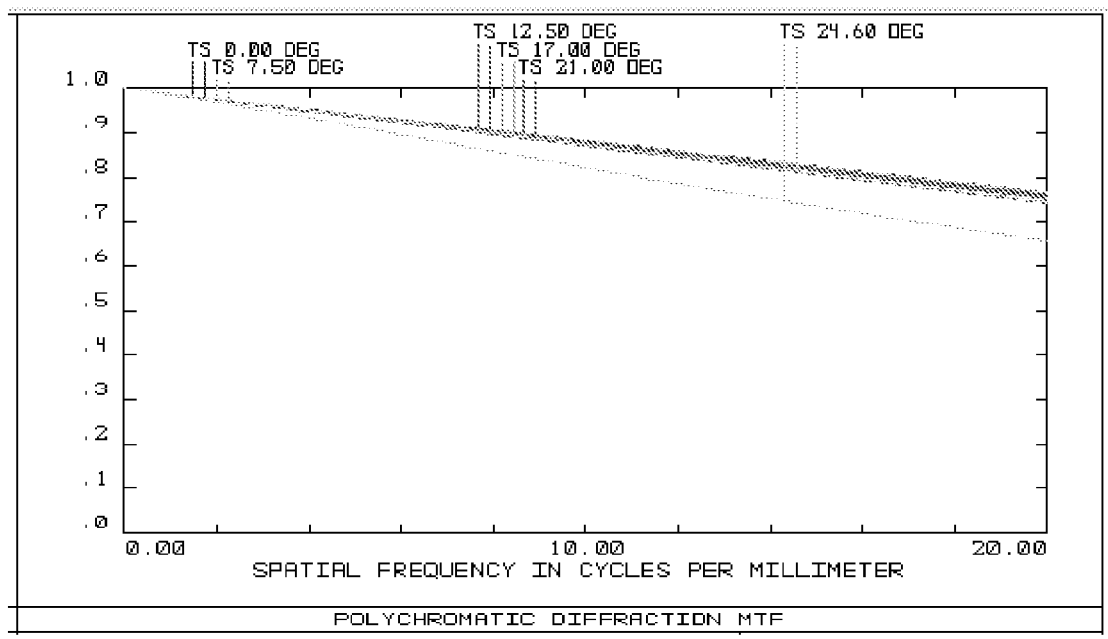
FIG. 4 is a diagram showing modulation transfer function M.T.F of the optical lens of FIG. 1.

FIG. 4 is a diagram showing transfer function M.T.F of the lens, which has reached or even exceeded the level of the general optical focusing lens.

By utilizing the optical lens according to the foregoing embodiments, the working wavelength band such as λ=1064 nm and the CCD visible band of λ=660 nm are on the same image surface, such that when a laser such as working wavelength band of λ=1064 nm is utilized to marking during the entire laser processing process, it can be faithfully reflected in the CCD rake surface, which can monitor the entire marking process to ensure that the entire marking process is accurate.

The foregoing embodiments are merely specific implementations of the present invention, but are not intended to limit the protection scope of the present invention. It should be noted that any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. An optical lens, comprising a first lens, a second lens, a third lens, and a fourth lens, which are successively coaxially arranged along a transmission direction of incident light, wherein the first lens and the fourth lens are negative meniscus lenses, the second lens is a positive meniscus lens, and the third lens is a positive plano-convex lens; the first lens has a first surface and a second surface, the second lens has a third surface and a fourth surface, the third lens has a fifth surface and a sixth surface, the fourth lens has a seventh surface and an eighth surface, two surfaces of each lens are a light incident surface and a light outgoing surface of the lens, respectively, the first to the eighth surfaces are successively arranged along the transmission direction of the incident light; the first surface, the second surface, the third surface, the fourth surface, the sixth surface, the seventh surface, and the eighth surface are convex towards the transmission direction of incident light.

2. The optical lens according to claim 1, wherein a radius of curvature of the first surface is −27±5% mm, a radius of curvature of the second surface is −110±5% mm, a central thickness of the first lens is 3±5% mm.

3. The optical lens according to claim 1, wherein a radius of curvature of the third surface is −90±5% mm, a radius of curvature of the fourth surface is −30±5% mm, a central thickness of the second lens is 10±5% mm.

4. The optical lens according to claim 1, wherein a radius of curvature of the fifth surface is ∞, a radius of curvature of the sixth surface is −63±5% mm, a central thickness of the third lens is 14±5% mm.

5. The optical lens according to claim 1, wherein a radius of curvature of the seventh surface is −55±5% mm, a radius of curvature of the eighth surface is −90±5% mm, a central thickness of the fourth lens is 5±5% mm.

6. The optical lens according to claim 1, wherein an interval between the second surface of the first lens and the third surface of the second lens along an optical axis is 2±5% mm, an interval between the fourth surface of the second lens and the fifth surface of the third lens along the optical axis is 0.5±5% mm, an interval between the sixth surface of the third lens and the seventh surface of the fourth lens along the optical axis is 20±5% mm.

7. The optical lens according to claim 1, further comprising a fifth lens, wherein the first lens, the second lens, the third lens, the fourth lens, and the fifth lens are successively coaxially arranged along the transmission direction of incident light, and the fifth lens is a planar lens.

8. The optical lens according to claim 7, wherein a central thickness of the fifth lens is 3±5% mm.

9. The optical lens according to claim 7, wherein the fifth lens has a ninth surface as a light incident surface and a tenth surface as a light outgoing surface, an interval between the ninth surface of the fifth lens and the eighth surface of the fourth lens along the optical axis is 2±5% mm.

* * * * *